United States Patent
Yelin et al.

(10) Patent No.: US 10,921,112 B2
(45) Date of Patent: Feb. 16, 2021

(54) REFLECTANCE CONFOCAL MICROSCOPY OF BLOOD CELLS

(71) Applicant: TECHNION RESEARCH & DEVELOPMENT FOUNDATION LTD., Haifa (IL)

(72) Inventors: Dvir Yelin, Haifa (IL); Adel Zeidan, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 278 days.

(21) Appl. No.: 15/759,864

(22) PCT Filed: Sep. 18, 2016

(86) PCT No.: PCT/IL2016/051034
§ 371 (c)(1),
(2) Date: Mar. 14, 2018

(87) PCT Pub. No.: WO2017/046806
PCT Pub. Date: Mar. 23, 2017

(65) Prior Publication Data
US 2018/0259318 A1 Sep. 13, 2018

Related U.S. Application Data

(60) Provisional application No. 62/219,925, filed on Sep. 17, 2015.

(51) Int. Cl.
*G06K 9/00* (2006.01)
*G01B 9/04* (2006.01)
(Continued)

(52) U.S. Cl.
CPC ............ *G01B 9/04* (2013.01); *G01N 15/147* (2013.01); *G01N 15/1459* (2013.01);
(Continued)

(58) Field of Classification Search
CPC .... G01B 9/04; G01N 15/1459; G01N 15/147; G01N 15/1475; G01N 2015/1006;
(Continued)

(56) References Cited

U.S. PATENT DOCUMENTS

| 6,341,036 B1 | 1/2002 | Tearney et al. |
| 7,231,243 B2 * | 6/2007 | Tearney ............. A61B 1/00082 600/407 |

(Continued)

FOREIGN PATENT DOCUMENTS

WO 2009/151610 A2 12/2009

OTHER PUBLICATIONS

EP16845846, Search Report, dated Apr. 18, 2019, European Patent Office.
(Continued)

*Primary Examiner* — Helen Shibru
(74) *Attorney, Agent, or Firm* — Alphapatent Associates, Ltd; Daniel J. Swirsky (57) ABSTRACT

Measurement of the three dimensional morphology of blood cells is performed using a model for simulating reflectance confocal images of the cells, providing the relation between cell morphology and the resulting interference patterns under confocal illumination. The simulation model uses the top and bottom membranes of the cell as the elements for generating the interference fringes, and takes into account the cell size, shape, angle of orientation and distance from the focal point of the confocal illumination beam. By comparing the simulated cell images to actual interference patterns obtained in confocal images obtained from the blood samples, the model can be used for providing three dimensional measurements of the individual cell morphology. This enables, for instance, in vitro measurement of the mean corpuscular volume of blood cells and diagnosis of
(Continued)

| Cell | α [°] | Δz [μm] | $R_0$ [μm] | $C_0$ [μm] | $C_2$ [μm] | $C_4$ [μm] | $Z_c^*$ (Cell profile) | $CV$ [μm²] |
|---|---|---|---|---|---|---|---|---|
| i | 0 | 0 | 3.95 | 1.00 | 8.2 | -4.0 | | 110 |
| ii | 30 | 0.5 | 3.60 | 0.81 | 7.83 | -4.39 | | 80 |
| iii | 0 | 0 | 3.71 | 1.14 | 7.8 | -4.5 | | 93 |
| iv | 10 | 0.5 | 3.41 | 1.00 | 5.0 | -4.2 | | 50 |
| v | 0 | 1.0 | 3.40 | 1.20 | 6.6 | -4.2 | | 70 |
| vi | 0 | 0.5 | 3.56 | 1.10 | 6.5 | -3.9 | | 75 |

-4 -2 0 2 4 [μm]

hematological disorders which are associated with cell morphology deviations, such as thalassemia and sickle cell anemia.

21 Claims, 6 Drawing Sheets (51) Int. Cl.
G02B 21/00 (2006.01)
G02B 21/36 (2006.01)
G01N 15/14 (2006.01)
G01N 15/10 (2006.01)

(52) U.S. Cl.
CPC ..... *G01N 15/1475* (2013.01); *G02B 21/0088* (2013.01); *G02B 21/36* (2013.01); *G01N 2015/1006* (2013.01); *G01N 2015/1493* (2013.01); *G01N 2015/1497* (2013.01)

(58) Field of Classification Search
CPC ... G01N 2015/1493; G01N 2015/1497; G02B 21/0088; G02B 21/36
USPC ...... 348/79; 382/128, 133–134; 356/39, 450
See application file for complete search history.

(56) References Cited

U.S. PATENT DOCUMENTS

| 8,115,919 B2* | 2/2012 | Yun | G01J 3/4412 |
| | | | 356/301 |
| 8,780,176 B2 | 7/2014 | Yelin et al. | |
| 8,873,027 B2* | 10/2014 | Sugiyama | G06K 9/00147 |
| | | | 356/28.5 |
| 8,965,487 B2* | 2/2015 | Bouma | A61B 5/0059 |
| | | | 600/476 |
| 10,324,019 B2* | 6/2019 | Diebold | G01N 15/1429 |
| 2001/0021018 A1* | 9/2001 | Basiji | G01N 21/6428 |
| | | | 356/326 |

OTHER PUBLICATIONS

L. Golan, et al., "Noninvasive imaging of flowing blood cells using label-free spectrally encoded flow cytometry," Biomed Opt Express, Jun. 1, 2012 (Published online May 21, 2012), vol. 3 No. 6, pp. 1455-1464, Washington D.C., USA.
C. Boudoux et al,, "Rapid wavelength-swept spectrally encoded confocal microscopy," Opt. Express 13 (2005), 8214-8221.
D. Yelin, et al,, "Large area confocal microscopy," Opt. Lett. 32 (2007), 1102-1104.
D. Kang et al, "Comprehensive imaging of gastroesophageal biopsy samples by spectrally encoded confocal microscopy," Gastrointestinal Endoscopy (2010), vol. 71, 35-43.
L. Golan and D Yelin, "Flow cytometry using spectrally encoded confocal microscopy", Opt. Lett. 35 (2010), 2218-2220.
T. Wilson and A.R Carlini, "Size of the Detector in Confocal Imaging Systems", Opt. Lett. (1987), vol. 12, pp. 227-229.
E. Evans and Y.-C. Fung, "Improved Measurements of the Erythrocyte Geometry," Microvascular Research (1972), vol. 4, pp. 335-347.
Huan Lei and George Em Karniadakis, "Quantifying the Rheological and Hemodynamic Characteristics of Sickle Cell Anemia", Biophysical Journal, Jan. 2012, vol. 102, 185-194.
PCT/IL2016/051034, International Search Report, dated Dec. 4, 2016.
PCT/IL2016/051034, Written Opinion, dated Dec. 4, 2016.

* cited by examiner

REFLECTANCE CONFOCAL MICROSCOPY OF BLOOD CELLS

CROSS-REFERENCE TO RELATED APPLICATIONS

This application is a U.S. National Phase Application under 35 U.S.C. 371 of International Application No. PCT/IL2016/051034, which has an international filing date of Sep. 18, 2016, and which claims the benefit of priority from U.S. Provisional Patent Application No. 62/219,925, filed Sep. 17, 2015, the disclosures of which are incorporated herein by reference in their entirety.

FIELD OF THE INVENTION

The present invention relates to the field of blood cell analysis, especially using reflectance confocal microscopy methods on a flowing stream of blood, for determining the morphology of different types of blood cells.

BACKGROUND

The properties of blood cells are remarkable indicators of the body's physiological condition. This is especially so for red blood cells (RBCs)—their density could indicate anemia or polycythemia, their absorption spectrum correlates with blood oxygenation, and their morphology is highly sensitive to various pathologic states including iron deficiency, ovalocytosis, and sickle cell disease. In vitro imaging and analysis of human RBCs have been demonstrated using a conventional blood smear, light scattering from an unstained blood smear, holographic microscopy, photo-acoustic microscopy, and confocal microscopy. In vivo imaging of RBCs, which is ideal for measuring the physiological properties of the cells within their natural environment, was first demonstrated using reflectance confocal microscopy (RCM) at high-resolution and without the need for fluorescence labeling. RCM has also been demonstrated as a promising method for other clinical diagnoses, such as of the oral mucosa, cornea, uterine cervix, and the skin, including the characterization of the various skin layers, and small capillaries. Spectral encoding techniques, such as are described in U.S. Pat. No. 6,341,036 to G. J Tearney et al, for "Confocal Microscopy with Multi-spectral Encoding" have improved several aspects of RCM by eliminating the need for rapid mechanical beam scanning; spectrally encoded confocal microscopy (SECM) has been shown useful for high frame rate imaging, as described in the article by C. Boudoux et al, entitled "Rapid wavelength-swept spectrally encoded confocal microscopy," published in Opt. Express 13, 8214-8221 (2005); and for imaging large tissue areas using simple, compact imaging probes, as disclosed in the article by D. Yelin, et al, entitled "Large area confocal microscopy," published in Opt. Lett. 32, 1102-1104 (2007), and in the article by D. Kang et al, entitled "Comprehensive imaging of gastroesophageal biopsy samples by spectrally encoded confocal microscopy," published in Gastrointestinal Endoscopy Vol. 71, 35-43 (2010).

By taking advantage of the unidirectional flow of blood within small capillary vessels, spectrally encoded flow cytometry (SEFC), as described in U.S. Pat. No. 8,780,176 for "Vessel imaging system and method" to the present inventor, a form of SECM that does not require any beam scanning has been demonstrated, promising an efficient method for measuring hematocrit and counting white blood cells in vivo.

A major challenge of all reflectance confocal imaging techniques, including laser-scanning RCM, SECM and SEFC, are interference effects that stem from the high spatial coherence of the focused beam. In most tissue types, these effects are manifested as speckle noise that significantly deteriorates imaging quality. When imaging RBCs, however, a characteristic appearance of curved features without significant speckle has been observed, such as is described in the article entitled "Flow cytometry using spectrally encoded confocal microscopy", by L. Golan and D. Yelin, the latter being one of the inventors in the present application, published in Opt. Lett. 35, 2218-2220 (2010). However, no method was provided as to how to characterize individual blood cells in the blood stream in the flow chamber, to enable performance of a blood count which could be sufficiently accurate for useful diagnostic determinations.

There therefore exists a need for a method and system for enabling the analysis of blood cells, based on the three dimensional morphology of freely suspended or flowing blood cells, which overcomes at least some of the disadvantages of prior art systems and methods.

The disclosures of each of the publications mentioned in this section and in other sections of the specification, are hereby incorporated by reference, each in its entirety.

SUMMARY

The present disclosure describes new exemplary systems and methods for performing blood counts or blood analysis, by performing reflectance confocal microscopy on a flow of diluted blood, and comparing interference patterns obtained from the detected blood cells with mathematically simulated confocal reflection patterns expected from the interaction of the focused illuminating beam with mathematical models of different types of blood cells. The unique interference patterns generated by the reflection of an incident light beam between the front surface and the back surface of a single cell allows direct sensing of the cell's three-dimensional shape. A simple model is used that simulates the reflectance from the cell of a tightly focused beam in a confocal microscope configuration. Due to interference between the reflections from the front and back cell-water interfaces, the resulting images are made up of several concentric ring fringes and curved features, with the patterns being very characteristic of the particular cell being imaged. Similar features are also seen in experimental SEFC images of RBCs as they flow in a diluted medium through a flow channel. SEFC is ideal for such comparison as it allows confocal imaging of individual cells without a nearby glass interface that would modify the interference patterns or disturb the natural cell shape. The same effect is achievable for conventional RCM measurements on static blood cells, if suspended in a matrix which maintains them isolated from their surroundings. By using this approach, it is possible to compute the volume of each individual cell and consequently, by direct volume ratio measurements, the mean corpuscular volume (MCV), which is an important and clinically useful RBC index. Besides the MCV determination, this analysis of the blood cells may be used to determine other blood parameters, such as the red cell distribution width (RDW), by quantifying the variety of individual cell volumes; the hematocrit (HCT) level, by determining the density of red blood cells; the number of red blood cells per volume (RBC), by dividing the HCT by MCV; the mean corpuscular hemoglobin (MCH) by correcting for errors in the MCH calculation (total hemoglobin divided by the RBC); and measurement of the amount of reticulocytes, from which information about the extent and source of anemia can be determined. This method could also be used for distinguishing between healthy and abnormal RBCs in autosomal recessive blood diseases such as thalassemia and sickle cell anemia, since cells having abnormal shapes can be readily detected by this system.

According to the methods of the present disclosure, a numerical model is developed that simulates the confocal reflectance image of a single RBC for various sized and shaped cells, and having various axial positions and tilt angles relative to the illuminating focused beam, and the resulting simulated images are compared to in-vitro SEFC images of flowing RBCs. This method allows the evaluation of the shape of the cells in three dimensions, with potential diagnostic capabilities that are based on accurate measurement of RBC morphology.

The system uses a confocal microscope method in which the upper and lower membranes of the cell are viewed at, or close to, the focus of the confocal imaging system, these positions being termed the focal region of the beam. This generates an interference pattern between the reflections from the upper and lower surfaces of the cell, and by using a simulation of predetermined mathematical models of a range of known blood cells, the interference pattern actually obtained can be compared with the expected interference patterns determined by the model simulation calculations. The simulations of the models have to be rigorously performed, since the confocal images are obtained from a Gaussian illuminating beam, at the focal point of the beam or close thereto, and this is a significantly more complex optical analysis problem than that of simple holographic measurements, taken with plane waves incident on the object to be analyzed. The simulations may conveniently be performed using the Fresnel approximation to express the interaction of the illuminating light beam with the optical surfaces of the cell, though it is to be understood that any mathematical formalism that will predict the optical amplitude distribution of the light reflected from the cell may equally well be used. These simulations on a given mathematical cell model enable the form of the obtained interference patterns to be interpreted as a function of the structure of the simulated model cell. The method uses a formalism that describes the optical fringe features of the confocally formed image, in terms of the morphology and orientation of the cell, and its position relative to the focal waist, and the refractive index of the cytoplasm, or any other relevant optical parameters of the cell, such as the optical properties of its surfaces. The form of the interference ring patterns can include the number of rings, the spacing between the various rings, the optical intensity of the different rings, and any other specific feature by which one interference pattern differs from another. A very large number of simulations should be performed for differently shaped cells, differently sized cells, differently oriented and differently positioned cells relative to the confocal point, in order to build up a library of expected interference patterns.

Now, conversely, when interference effects are observed in a cell sample during measurement, use of the rigorously performed simulations of such interference effects enables the three-dimensional structure and position of the observed cell to be determined (where the term structure is understood to include, inter alia, size, angular orientation and shape), based only on identification of the interference effects observed. According to a first implementation of the systems and methods of the present disclosure, an automated system can identify common features of the interference patterns of the cells being imaged, and using a comparison process with the library of known patterns previously generated, can determine the specific dimensional properties and structure of the cell being imaged. This method of determining the three-dimensional structure of a blood cell may provide substantially more information, and substantially more accurate information than other methods used for real time investigation of blood cells. Thus, histological staining, for instance, cannot in general provide much significant three-dimensional information about the cells other than an indication of their thickness. Additionally, electron microscope studies, for instance, can generally only provide information about the outer membrane of the cell.

In the present described systems and methods, the simulated interference patterns are calculated for reflections from the top and bottom outer membranes of a model of the cell. Therefore, one novel feature of the methods used is that there is an important requirement in performing simulations of in vitro blood cells, to ensure that the blood cells are in suspension and are truly free of physical interference from neighboring blood cells and from support surfaces. The presence of support surfaces does not enable an accurate model simulation to be performed on blood cells, since the interference may be formed by reflection from one membrane and the support surface, or a combination of the second membrane and the support surface. Such an interference pattern may be very different from an interference patent obtained from the top and bottom membranes of a free blood cell, and would not indicate accurate information about the structure of the blood cell. Likewise the close presence of other blood cells may distort the shape, size or structure of the blood cell being imaged, thereby generating an interference pattern which is not typical of the true shape, size or structure of that blood cell. For this reason, the system of the present disclosure uses a flow method for imaging the blood cells, similar to that described in the above referenced article by Golan and Yelin. The blood cells are diluted, typically in phosphate buffered serum containing 2% fetal bovine serum, before being streamed past the confocal imaging region of the microscope system. This enables perfectly free blood cells to be imaged, unaffected by any local deformations. The dilution also reduces other imaging artifacts due to a higher density of cells in the imaged region. Furthermore whereas in a static microscope imaging process, a comparatively small number of cells can be viewed in the field of view of the microscope, typically of the order of one or more hundreds, in the flowing confocal microscope method of the present disclosure, a substantially larger number of cells can be imaged and analyzed, since the diluted blood flows continuously past the focal spot of the microscope. This advantage is very important, since it enables statistical measurements to be made on very large numbers of blood cells, such that certain types of defective blood cells, which may occur only rarely in the bloodstream, can be readily detected. Thus for instance, the blood of a person having a sickle cell anemia condition, can be positively analyzed for this condition, even in situations where the person is not suffering from an attack, since, even though the occurrence of sickle cells is then very low, they can be readily detected by the methods of the present system. In contrast to these methods, there is a much more remote chance of discovering a sickle cell in a static microscope investigation of only a few hundred cells of the subject's blood. Other blood diseases may also have cells having a distorted morphology or reduced sizes, and if such cells are present only in small quantities, they are much more readily detected by using the flow techniques of the present systems.

The model of a cell is described by generating an analytic function which describes the structure and symmetry of the cell in three dimensions, such as a polynomial designation, or even by coordinate mapping of a drawing of the cell. Once a model has been defined mathematically, the interaction of the incident optically focused beam with the defined structure is determined by using any suitable optical interaction routine. The routine takes into account reflections from the top surface of the cell and the bottom surface of the cell, the refractive index of the cell interior, the angle which the centerline of the cell makes with the illuminating beam, any deviation of the center of the cell from the focal point of the incoming beam, and any other features which will affect the optical paths and curvatures of the beam interacting with the cell structure, such as specific shape anomalies from a circular or elliptic model, for instance, the indentations found in sickle cells. The output of these computations is a series of synthesized interference ring patterns, each one representing a set of parameters characterizing a different virtual cell model, situated at a different focal position relative to the incident confocal beam, and aligned at a different angle to that beam. These ring patterns may be stored in a library of models, each pattern being associated with a different cell model, and located in a different position relative to the focal point of the illuminating beam and at a different orientation. This bank of models and their associated patterns of interference fringes calculated using the simulation methods used in the system, may then constitute a lookup table for referencing images obtained by the system in real time. By this means it becomes possible to perform a real time analysis of blood cells streaming through the confocal microscopy flow cell, and thus to obtain a real time blood count, covering as many different types of blood cells as have been used to model the expected interference fringe patterns. This continuous flow implementation requires the use of the SEFC method of acquiring the images of the blood cells. However by using conventional RCM imaging, it is also possible to analyze static blood cell samples, though in order to achieve the advantages of the methods of the present disclosure, it is necessary to maintain the blood cells suspended remotely from each other, such as by trapping them in a hydrogel matrix.

Since there are potentially such a huge number of possible combinations of shape deviations from a spherical or elliptical blood cell structure, the size of an image bank that contains many of such combinations may be so large as to be unworkable with currently available computing and image processing capabilities. According to a further implementation of the present described system, it is possible to overcome this problem by utilizing an iterative matching process. The algorithm will first characterize an interference image pattern received, and then look for the closest library image to that interference pattern. The process then performs a small deformation in the structure of the virtual cell which provided that closest image, runs that structure through the optical interaction model to generate the interference patent obtained therefrom, and compares the newly acquired pattern with the pattern actually obtained from the cell being imaged. This iterative process is repeated until a closest match is obtained to the interference pattern obtained, as determined by some threshold level which defines what is regarded as a sufficiently close match to characterize the cell being imaged.

According to an even further implementation of the methods of the present disclosure, it is possible to perform the cell analysis by determining the shape of a cell being imaged without any need for an image bank of sample interference fringe patterns from which to obtain a close match to the image interference pattern obtained. According to this implementation, the image processing program, utilizing a genetic algorithm, acquires the imaged interference pattern, runs through an iterative process of determining which three-dimensional cell structure would lead to that particular interference patent, and then outputs that three-dimensional structure. This can be performed by commencing with a nominal cell structure, which could use some basic assumptions about the nature of the imaged fringe pattern in order to decide which nominal cell structure is used in order to commence the iterative procedure. The routine then makes iterative adjustments to that initial nominal cell structure, and observes after running the optical interaction simulation on that structure, whether the fringe patterns obtained at each iteration, move closer to or diverge from the actual interference pattern of the cell being imaged. By this means the procedure converges on a particular three-dimensional cell structure which provides a sufficiently close match to the interference pattern actually obtained from the imaged cell. That blood cell has then been characterized, without the need for any image bank.

There is thus provided in accordance with an exemplary implementation of the devices described in this disclosure, a method for determining details of the morphology of blood cells, comprising:

(i) obtaining at least one confocal image showing at least a portion of a blood cell from a sample of the blood cells located in the focal region of an illuminating beam of a reflectance confocal microscopy system, (ii) identifying in the at least one confocal image, an imaged optical interference pattern, (iii) comparing the imaged optical interference pattern with simulated optical interference patterns calculated from the interaction of an illuminating optical beam with three dimensional models of blood cells, each three dimensional model having its own known morphology, and (iv) based on the comparison, determining details of the morphology of the imaged blood cell.

In such a method, the simulated optical interference patterns may be calculated by using the Fresnel approximation to express the interaction of an illuminating optical beam with features of the three dimensional models of blood cells. In particular, the simulated optical interference patterns may be calculated based on the interaction of an illuminating optical beam with at least the surfaces of the cells facing and remote from the impinging illuminating optical beam. Furthermore, according to other implementations, the simulated optical interference patterns may be calculated also taking into account the orientation of the cells, and their position relative to the focal point of the confocally focused beam.

In any of the above described methods, the sample of the blood cells may be diluted in order to reduce any of imaging artefacts and the interaction of imaged cells with other cells. Additionally, the sample of blood cells may either flow past the focal region of the illuminating beam in a flow chamber, or it may be a static sample set in a gel matrix.

Still other example implementations involve a method as described above wherein the step of comparing may be performed by storing a plurality of the simulated optical interference patterns with their associated morphologic details in a data bank, and determining which of the simulated optical interference patterns has parameters which match those of the imaged optical interference pattern to within a predetermined threshold. In such a case, the step of comparing may comprise the determining of which of the simulated optical interference patterns has parameters having the closest fit to those of the imaged optical interference pattern. In either of the methods described in this paragraph, the optical interference pattern may comprise various ring shapes, and the parameters may then include at least one of the number of rings, the spacing between the various rings, and the optical intensity of the different rings.

According to an alternative exemplary method for determining details of the morphology of blood cells, in any of the above procedures, the step of comparing may comprise:
(i) generating a limited number of the simulated optical interference patterns,
(ii) comparing which of the limited number of simulated optical interference patterns is closest to the imaged optical interference pattern, and
(iii) iteratively adjusting physical parameters of the three dimensional model of the blood cell having a simulated optical interference patterns closest to the imaged optical interference pattern, in order to improve the match of the closest simulated optical interference pattern to the imaged optical interference pattern.

Furthermore, in another alternative implementation of any of the above-described methods, the step of comparing may comprise:
(i) creating a three dimensional model of a blood cell which is estimated to have a simulated optical interference pattern comparable to the imaged optical interference pattern,
(ii) adjusting at least one feature of the three dimensional model of a blood cell, and deriving a new simulated optical interference pattern by calculating the interaction of the illuminating optical beam with the adjusted three dimensional model of the blood cell,
(iii) determining whether the new simulated optical interference pattern is a closer match to the imaged optical interference pattern, and
(iv) repeating the adjusting step (ii) and the determining step (iii) until the match between the new simulated optical interference pattern and the imaged optical interference pattern falls within a predetermined level.

In alternative implementations of any of the above methods the three dimensional model of a blood cell may be obtained by generating a mathematical analytic function which describes the morphology of the blood cell in three dimensions. In such a situation, the morphology comprises at least the structure and symmetry of the blood cell. Furthermore, the mathematical analytic function may be a polynomial designation of the morphology of the blood cell.

Additionally, the above described methods may further comprise comparing the details of the morphology of the imaged blood cell to the morphology of a normal or an abnormal cell. Additionally, any of the methods may further comprise calculating the corpuscular volume of the imaged blood cell.

Finally, in any of the above described methods, the reflectance confocal microscopy system may be spectrally encoded.

Still other example implementations described in this disclosure involve a system for analyzing blood cells in a blood sample, comprising:
(i) a confocal microscopy system generating confocal images of a sample of blood cells disposed in the focal region of the microscope objective lens,
(ii) a signal processor module adapted to receive from the confocal microscopy system at least one of the confocal images showing at least a portion of a blood cell,
(iii) a data bank comprising a plurality of simulated optical interference patterns calculated from the interaction of an illuminating optical beam with three dimensional models of blood cells, each three dimensional model having its own known morphology, and
(iv) an output unit configured to provide details of the blood analysis of the sample,
wherein the signal processor module is adapted:
(a) to identify in the image, an imaged optical interference pattern,
(b) to compare the imaged optical interference pattern with simulated optical interference patterns stored in the data bank, and
(c) based on the comparison, to determine details of the morphology of the confocally imaged blood cell.

In such a system, the details of the blood analysis of the sample may comprise the fractional composition of the blood sample derived from the numbers of cells having specific morphologies. Furthermore, the reflectance confocal microscopy system may be spectrally encoded. Any of the above-described systems may comprise a blood flow chamber, and the sample of blood cells may then flow past the focal region of the illuminating beam in a flow chamber. Alternatively, the sample of the blood cells may be a static sample set in a gel matrix.

BRIEF DESCRIPTION OF THE DRAWINGS

The present invention will be understood and appreciated more fully from the following detailed description, taken in conjunction with the drawings in which.

DETAILED DESCRIPTION

Figure 1:
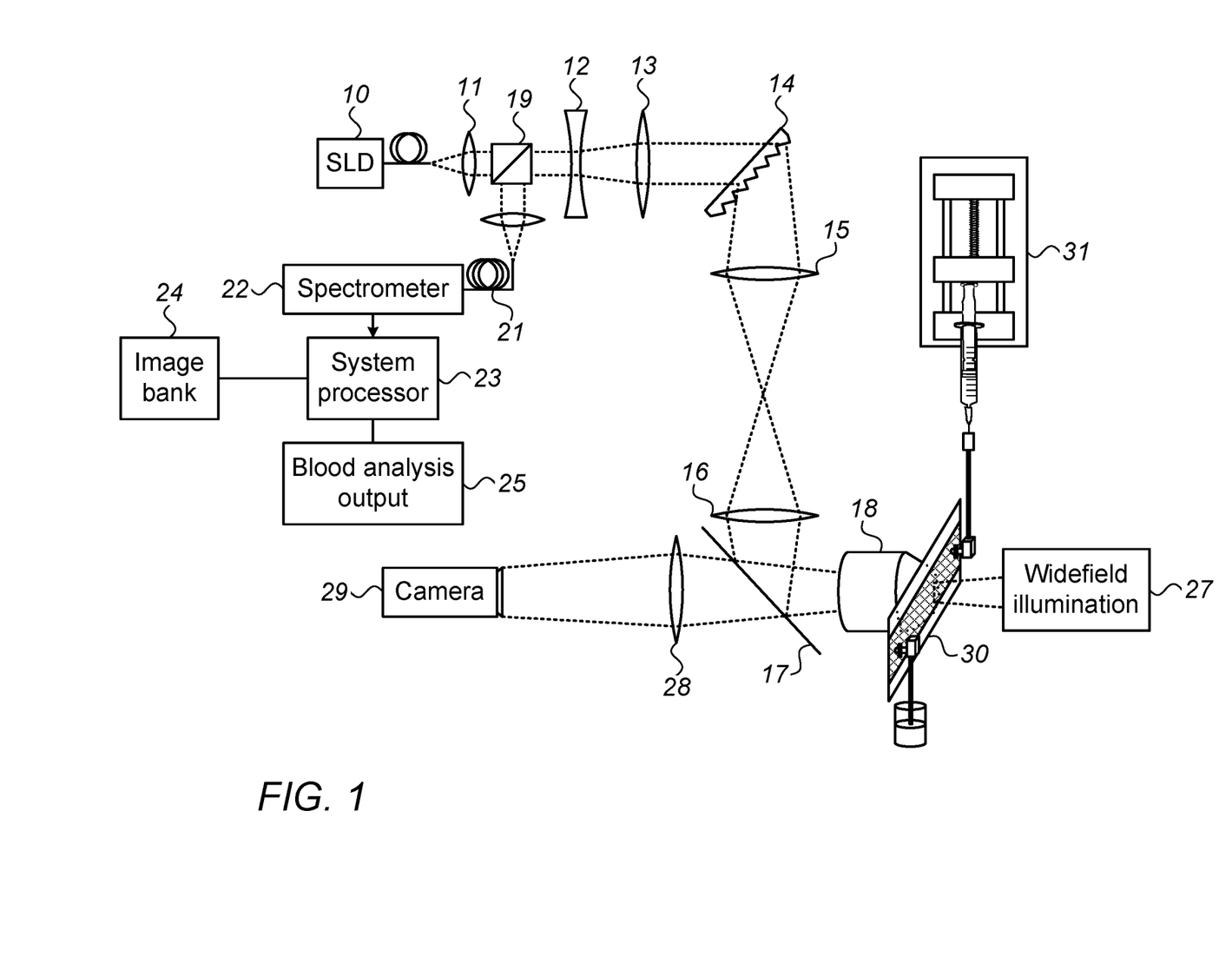
FIG. 1 illustrates schematically an exemplary SEFC system for imaging flowing blood cells in vitro.

Reference is now made to FIG. 1, which illustrates schematically an exemplary SEFC system for reflectance confocal imaging of the flowing blood cells in vitro. The system uses a diffraction grating to separate broadband illumination light into its components across a single transverse line within the flow channel. The spectrally encoded reflections from the flowing cells are collected through the same optical path into the core of a single-mode fiber and directed to a fast spectrometer that decodes the spectral reflectance. As a result, the SEFC system enables instantaneous confocal imaging of an entire line, resulting in a fast, compact imaging system that does not require any beam scanning. A two-dimensional confocal image of the blood is obtained as the cells flow in the direction (y-axis) perpendicular to the imaged line (x-axis).

In the system illustrated in FIG. 1, broadband light from a fiber-coupled super-luminescent diode array 10 (such as Superlum, 840 nm. central wavelength, 50 nm. bandwidth) is collimated by an achromatic lens 11, magnified using an achromatic telescopic arrangement 12, 13, and focused into a spectrally encoded transverse line using a transmission diffraction grating 14, typically having 1200 lines/mm, such as is provided by Wasatch Photonics Inc, of Logan, Utah, USA, a unit magnification achromatic telescopic arrangement 15, 16, a dichroic mirror 17 typically having a 680 nm cut-on wavelength, and a 60× water-immersion NA=1.2 objective lens 18. Light reflected from the cells being streamed through a flow chamber 30 is propagated back through the same optical path, deflected by a polarization-independent cubic beam splitter 19 (BS) and focused 20 into a single-mode fiber 21 that serves as the confocal pinhole of the system, and is measured by a high-speed (up to 70k spectra/s) spectrometer 22.

The output of the spectrometer is processed by the instrument's control system 23, which, as was explained hereinabove, performs a comparison of the interference ring pattern observed in each cell image with an image bank 24 of previously generated images of simulated interference ring patterns. These simulated interference ring patterns are created by using a theoretical model of the interaction of the incident focused light beam with cells of different shapes and structures, and they are stored in the image bank 24, which the processor in the instrument's control system 23 accesses in its search for a match to the interference pattern imaged confocally from the blood cell being analyzed. Once a suitable match has been achieved, the system processor will output information regarding the type and size of the cell analyzed. This information may conveniently be provided from a blood analysis output unit 25 in the form of a blood analysis based on the comparative or absolute numbers of different types of blood cells, (depending on the parameter involved), as determined by the morphology and occurrence of the different types of blood cells in the sample imaged.

Alternative implementations of the system of FIG. 1 may use a system processor which eliminates the need to access an image bank, by generating its own initial guess at a close interference ring pattern, and then using a genetic algorithm in order to iteratively amend the parameters of the cell model used to generate that ring pattern, in order to simulate the expected interference ring pattern, repeating this procedure until an acceptable match to the actual image pattern is achieved.

According to a further exemplary implementation of the systems of this disclosure, additional bright-field imaging of the cells may be achieved using transmission wide-field illumination by an incoherent visible light 27, a cold mirror, 17, typically with 680 nm cut-on wavelength, an achromatic lens 28 and a monochrome video camera 29 typically providing up to the order of 100 frames/s. Blood samples to be analyzed may be collected in a vacutainer containing an anticoagulant. The blood is diluted, typically to between a 1:100 to a 1:1000 ratio, such as using phosphate buffered serum containing 2% fetal bovine serum as a diluent, is inserted into a syringe pump, such as can be provided by Harvard Apparatus of Holliston, Mass., U.S.A., and may be pushed at a velocity of approximately 1 mm/s through a transparent plastic flow channel 30 with a rectangular 5 mm×0.1 mm cross section and a 0.17-mm-thick front wall.

In order to determine the three dimensional shape of individual cells, a numerical simulation of a reflectance confocal imaging process is shown, which uses the Fresnel approximation to calculate the resulting image from two reflecting membranes of a cell of arbitrary surface morphology. However, it is to be understood that the analytical method of expression of the cell shapes, and the simulation method described herienbelow are only one exemplary way of characterizing the relationship between the cell morphology and the resulting interference patterns, and that any other suitable formalism may also be used in the execution of the methods of the presently described system.

Figure 2:
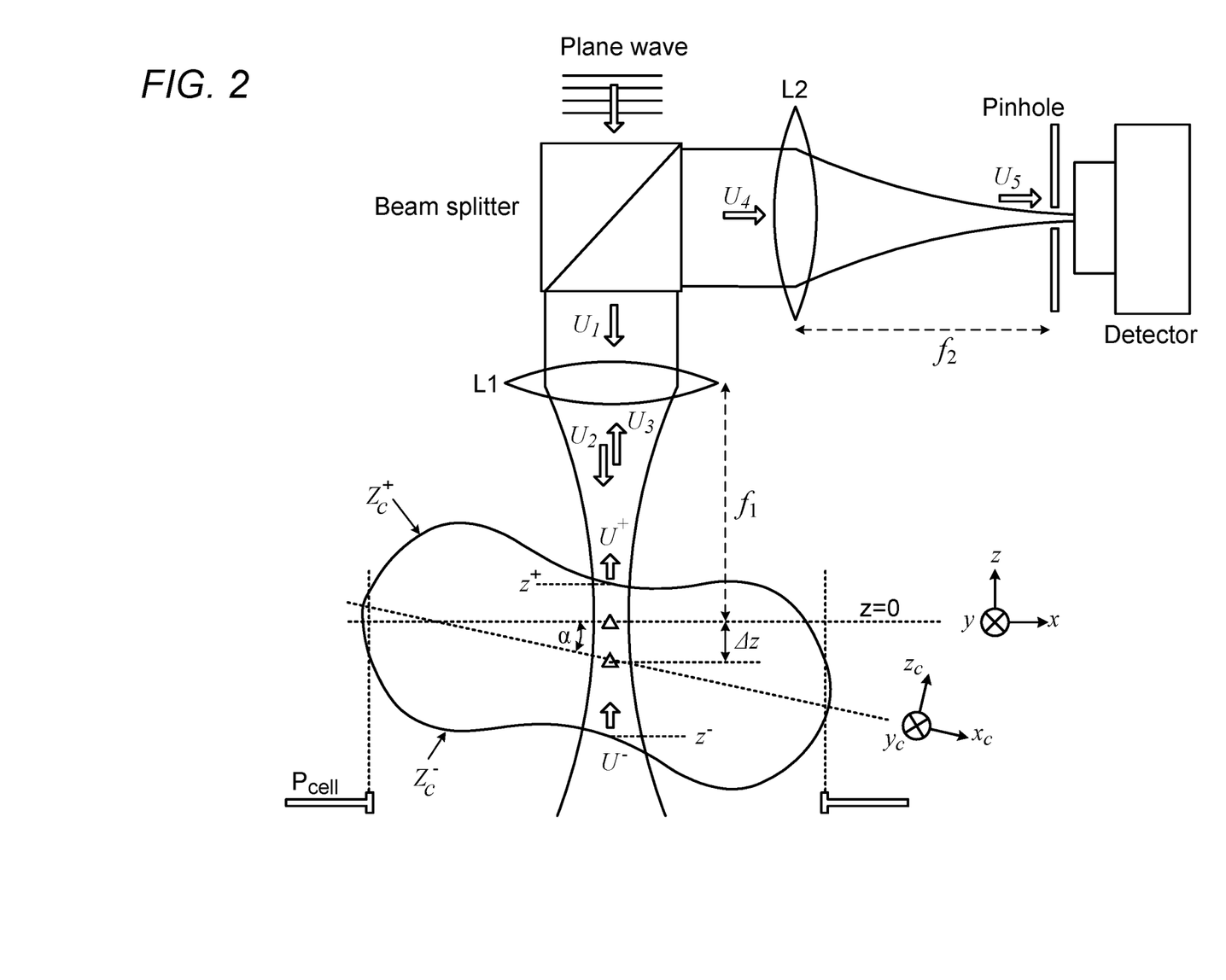
FIG. 2 illustrates schematically a simplified section of a reflectance confocal imaging system, showing the basic optical confocal path, and the parameters used in the simulation procedure of the present disclosure.

Reference is now made to FIG. 2, which illustrates schematically a simplified section of a reflectance confocal imaging system, showing the basic optical confocal path, and the parameters to be used in the simulation procedure. The optical arrangement shown in FIG. 2, using focusing lenses L1 and L2, is slightly different from that shown in the complete system of FIG. 1, in order to more clearly show the formalism of the simulation calculations. The calculation begins with an analytical expression for the cell shapes. According to the Fresnel approximation, the electromagnetic field $U_2$ after the lens L1 that is illuminated by a monochromatic plane wave $U_1$, is given by:

$$U_2(x, y, z) = \frac{ie^{ik(f_1-z)}}{\lambda(f_1 - z)} \int\int U_1 P_{L1} e^{-i\frac{k}{2f_1}(x^2+y^2)} e^{-i\pi\frac{(x-x')^2+(y-y')^2}{\lambda(f_1-z)}} dx'dy', \quad (1)$$

where $\lambda$ denotes the wavelength, $k=2\pi/\lambda$, and $f_1$ and $P_{L1}$ denote the focal length and the pupil function of the lens L1, respectively. The cell is represented by the front and back surfaces denoted by $Z_c^+$ and $Z_c^-$ in the drawing. An image of the cell is acquired by scanning in the lateral x-y plane. Within the cell, on the centerline of the focused beam, there are two small triangles. The upper one in the drawing represents the origin of the optical system at the beam focus, and the low one represents the origin of the cell coordinates. As is observed, the center of the cell is displaced from the confocal point by a distance $\Delta z$, to represent a typical situation in which the cell is disposed within the focal region, but not exactly at the focal point of the confocal imaging system.

The formalism developed in the paper by T. Wilson and A. R Carlini, entitled "Size of the Detector in Confocal Imaging Systems", as published in Opt. Lett., vol. 12, pp. 227-229 (1987) is used to compare with the simulated field amplitude distributions around the focal plane of the objective lens of such a confocal imaging system.

Figure 3A:
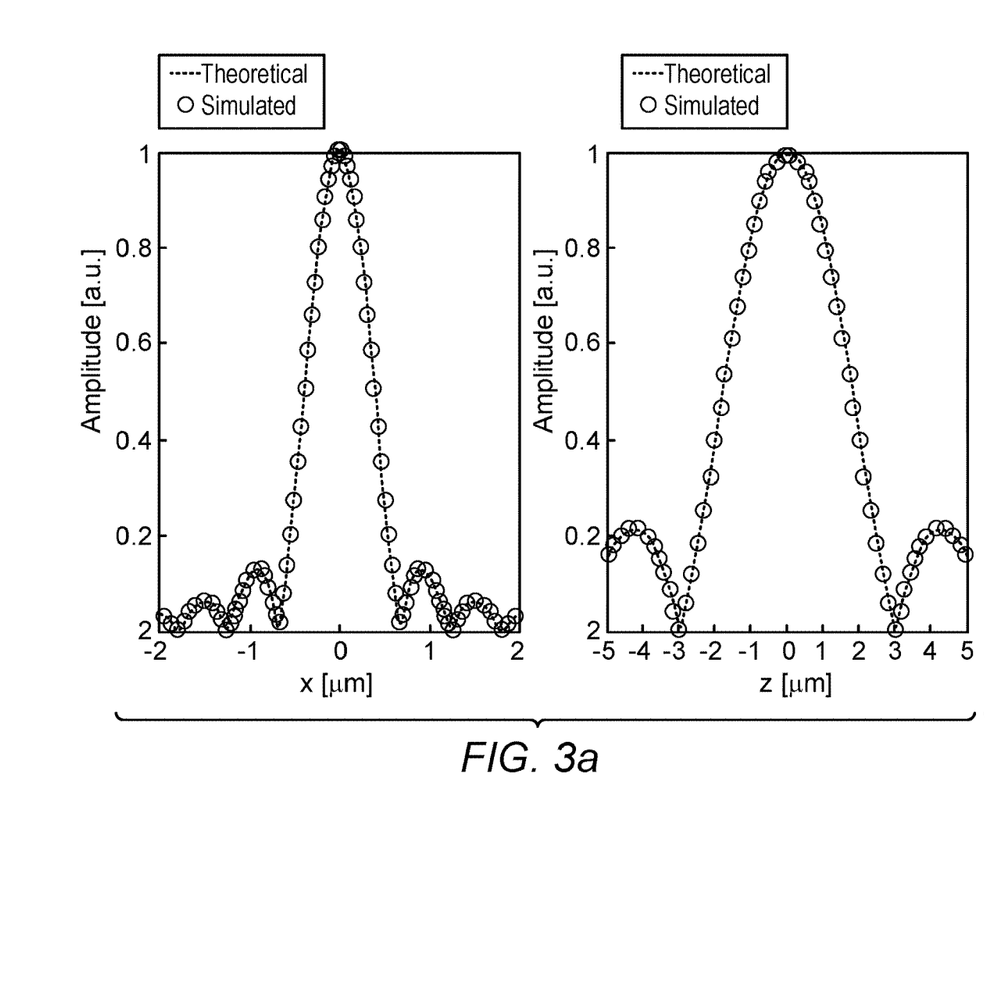
FIGS. 3a and 3b show respectively a comparison of the simulated and theoretically derived optical field amplitude distributions (FIG. 3a) and an exemplary x-z cross-sectional view of a simulated model cell, showing the optical field distribution at the focal region (FIG. 3b)
Figure 3B:
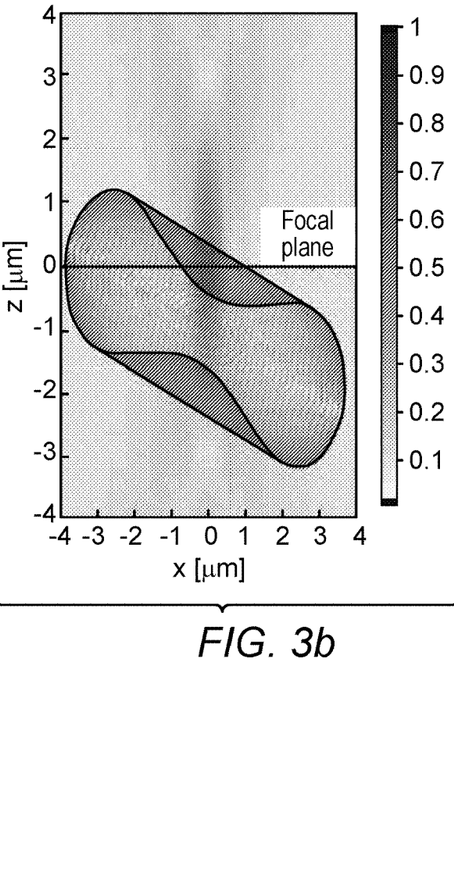

Reference is now made to FIGS. 3a and 3b. FIG. 3a illustrates the optical field amplitude distributions, showing a comparison between the simulated results and those derived theoretically from the methods described in the above-mentioned Wilson and Carlini paper. The left hand graph of FIG. 3a shows the lateral optical field amplitude distribution around the focal plane for a water immersion objective lens having a numerical aperture NA=0.6, at a wavelength $\lambda$ of 840 nm. The right hand graph of FIG. 3a shows the equivalent axial optical field amplitude distribution. As is observed, the results of the simulated optical field amplitude (open circles) agree well with the analytical expression (dashed lines) given in the Wilson and Carlini paper:

$$U(u, v) = \int_0^1 J_0(v\rho)e^{-\frac{i}{2}u\rho^2}\rho d\rho, \quad (2)$$

where $J_0$ is zero-order Bessel function, $\rho$ denotes the normalized radial coordinate at the pupil plane, and u and v denote the normalized radial and axial coordinates.

FIG. 3b illustrates schematically an exemplary x-z cross-sectional view of a simulated model cell, with the distribution of the optical field at the focal region shown by the gray shaded areas extending from the cell along the optical axis of the illuminating beam. The center spot and the annular system of interference fringes are clearly visible in this representation. The simulated cell is shown having a 20° tilt angle $\alpha$, and positioned at a distance $\Delta z=1$ µm below the focal plane.

Assuming that the reflections from an RBC originate primarily at the cell's plasma membranes, the reflected wavefront should have phase structures that follow the detailed curvature of the cell membrane. In the article by E. Evans and Y.-C. Fung entitled "Improved Measurements of the Erythrocyte Geometry," published in Microvascular Research, Vol. 4, pp. 335-347 (1972), an approximate analytical expression for the front $Z_c^+$ and back $Z_c^-$ surfaces of an RBC has been derived, as follows:

$$Z_c^{\pm}(x_c, y_c) = \left[C_0 + C_2\left(\frac{\sqrt{x_c^2+y_c^2}}{R_0}\right)^2 + C_4\left(\frac{\sqrt{x_c^2+y_c^2}}{R_0}\right)^4\right] \cdot (\pm) \sqrt{1-\left(\frac{\sqrt{x_c^2+y_c^2}}{R_0}\right)^2} \quad (3)$$

where $R_0$, $C_0$, $C_2$ and $C_4$ are specific shape parameters and the subscript 'c' denotes coordinates in the frame of reference of the cell.

For a given lateral position $(x_c, y_c)$ of the illumination optical axis, the waves $U^+$ and $U^-$ reflected from the front and back cell-medium interfaces, respectively, are given by:

$$U^{\pm}(x,y,z^{\pm};x_c,y_c)=U_2(x,y,z^{\pm})e^{i2k[Z_c^{\pm}(x+x_c,y+y_c)-Z_c^{\pm}(x_c,y_c)]} P_{cell} \quad (4)$$

where $z^+$ ($z^-$) denotes the axial coordinate of the intersection between the front (back) cell interface and the optical axis, $P_{cell}$ denotes the cell pupil function (see FIG. 2), and the digit 2 at the exponential term results from the roundtrip optical path of the reflected wave. For simplicity, and to avoid numerical artifacts, $P_{cell}$ was made slightly smaller than the actual cell size, in order to be able to neglect reflections from the edges of the cell where angles between the membrane's normal and the optical axis are much larger than the maximum illumination and collection cone angles (26.8°). The wave $U_3$ reflected back from the cell is thus the sum of $U^+$ and $U^-$ after propagating a distance of $f_1-z^+$ and $f_1-z^-$, respectively, toward the objective lens L1:

$$U_3(x, y) = \frac{ie^{-ik(f_1-z^+)}}{\lambda(f_1-z^+)}\int\int U^+ e^{-i\pi\frac{(x-x')^2+(y-y')^2}{\lambda(f_1-z^+)}} dx'dy' + \quad (5)$$

-continued $$\frac{ie^{-ik(f_1-z^-)}}{\lambda(f_1-z^-)}\int\int U^- e^{-i\pi\frac{(x-x')^2+(y-y')^2}{\lambda(f_1-z^-)}} dx'dy'$$

The wavefront $U_4$ immediately before the lens L2, is calculated by multiplying $U_3$ by the lens L1 transfer function and propagating a distance $f_2$ toward the lens L2:

$$U_4(x, y) = \frac{ie^{-ikf_2}}{\lambda f_2}\int\int U_3 P_{L1} e^{-i\frac{k}{2f_1}(x'^2+y'^2)} e^{-i\pi\frac{(x-x')^2+(y-y')^2}{\lambda f_2}} dx'dy'. \quad (6)$$

The complex amplitude of the wave $U_5$, just before the pinhole, is calculated by multiplying the wave $U_4$ by the transfer function of the lens L2 and propagating a distance $f_2$:

$$U_5(x, y) = \frac{ie^{-ikf_2}}{\lambda f_2}\int\int U_4 P_{L2} e^{-i\frac{k}{2f_2}(x'^2+y'^2)} e^{-i\pi\frac{(x-x')^2+(y-y')^2}{\lambda f_2}} dx'dy'. \quad (7)$$

Finally, assuming an infinitesimally small pinhole, the signal measured by the detector is calculated as the wave intensity only at the optical axis, i.e. $I(x_c,y_c)=|U_5(0,0)|^2$. The complete confocal image of the entire cell $I(x_c,y_c)$ is calculated by following Eqs. (4)-(7) for all lateral positions of the imaging beam.

Figure 4:
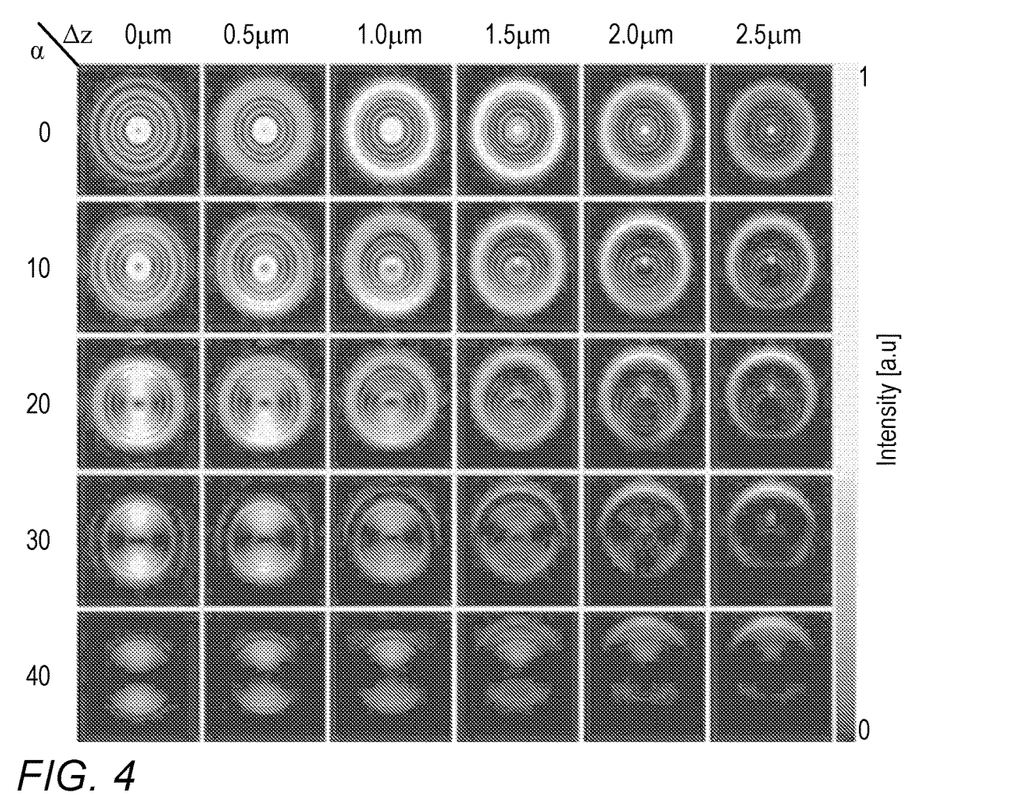
FIG. 4 shows a set of simulated confocal images of a red blood cell, calculated using a model described in this disclosure.

Reference is now made to FIG. 4, which shows a set of simulated confocal images of a red blood cell, calculated using the above described model. The simulated images are shown for different axial positions $\Delta z$ from the focal point and for different tilt angles $\alpha$. The size of each panel is 8 µm×8 µm. The cell shape is calculated according to Eq. (3) using the parameters reported in the Evans and Fung article, as follows:

$R_0=3.91$ µm, $C_0=0.81$ µm, $C_2=7.83$ µm, and $C_4=-4.39$ µm.

The field symmetry around the focal plane results in similar images for positive and negative axial displacements, while the cell's radial symmetry results in similar images for positive and negative tilt angles. The simulated images were composed of various bright rings and curves, generated by interference between the two waves reflected from the top and bottom cell-water interfaces. In general, high-brightness images with partial radial symmetry were obtained for $\Delta z<2$ µm and tilt angles below 30°, as is shown in the top left hand region of the panels of simulated images. The relative brightness of the rings varies for different axial shifts: in perfect focus ($\Delta z=0$) the inner ring is the brightest, while for $\Delta z=1$ µm the outer ring is more visible. High tilt angles, typically of more than 20°, result in a characteristic bowtie pattern with low-contrast, superimposed interference rings. At high tilt angles and large defocusing, the cell appears as a very dim arc. Additional simulations with different cell morphological parameters reveal that the number of rings or arcs is determined primarily by the overall cell thickness variations; thicker cells with a thin central region have more transitions between constructive and destructive interference, and hence a higher number of concentric rings.

Figure 5:
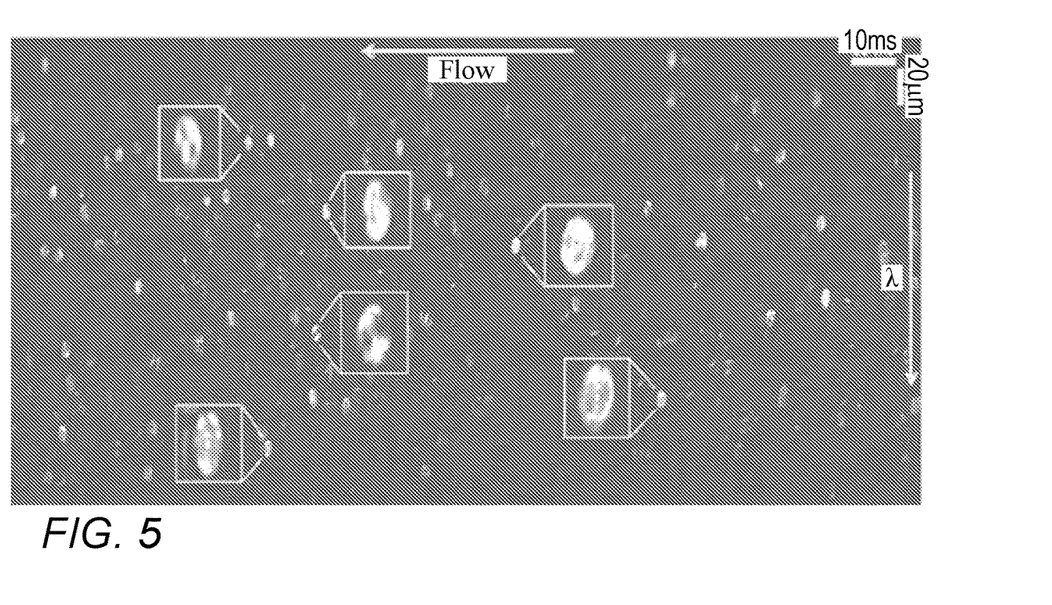
FIG. 5 shows a typical SEFC image of diluted (1:20) blood within the flow chamber.

Reference is now made to FIG. 5, which shows a typical SEFC image of the diluted (1:20) blood within the flow chamber, showing the scattered spots that correspond primarily to individual RBCs. The rectangles shown next to selected cells are 6× magnified views, to illustrate the form of the interference fringes obtained.

By varying the different size parameters, the simulated images may be matched to actual SEFC images of the cells. A number of steps may be used to perform this matching. First, the number of concentric rings in the SEFC image is matched in the simulated image by choosing appropriate $C_0$ and $C_2$ parameters. Secondly, adjustment of all $C_{0-4}$ parameters may be performed to fine-tune the ring width and spacing. Thirdly, a look-up table loaded with data similar to that shown in FIG. 4, may be constructed, from which the tilt angle $\alpha$ and the axial displacement $\Delta z$ are chosen that best match the actual SEFC image. Finally, the cell radius $R_0$ is set to match the transverse dimensions of the imaged cell.

Figure 6:
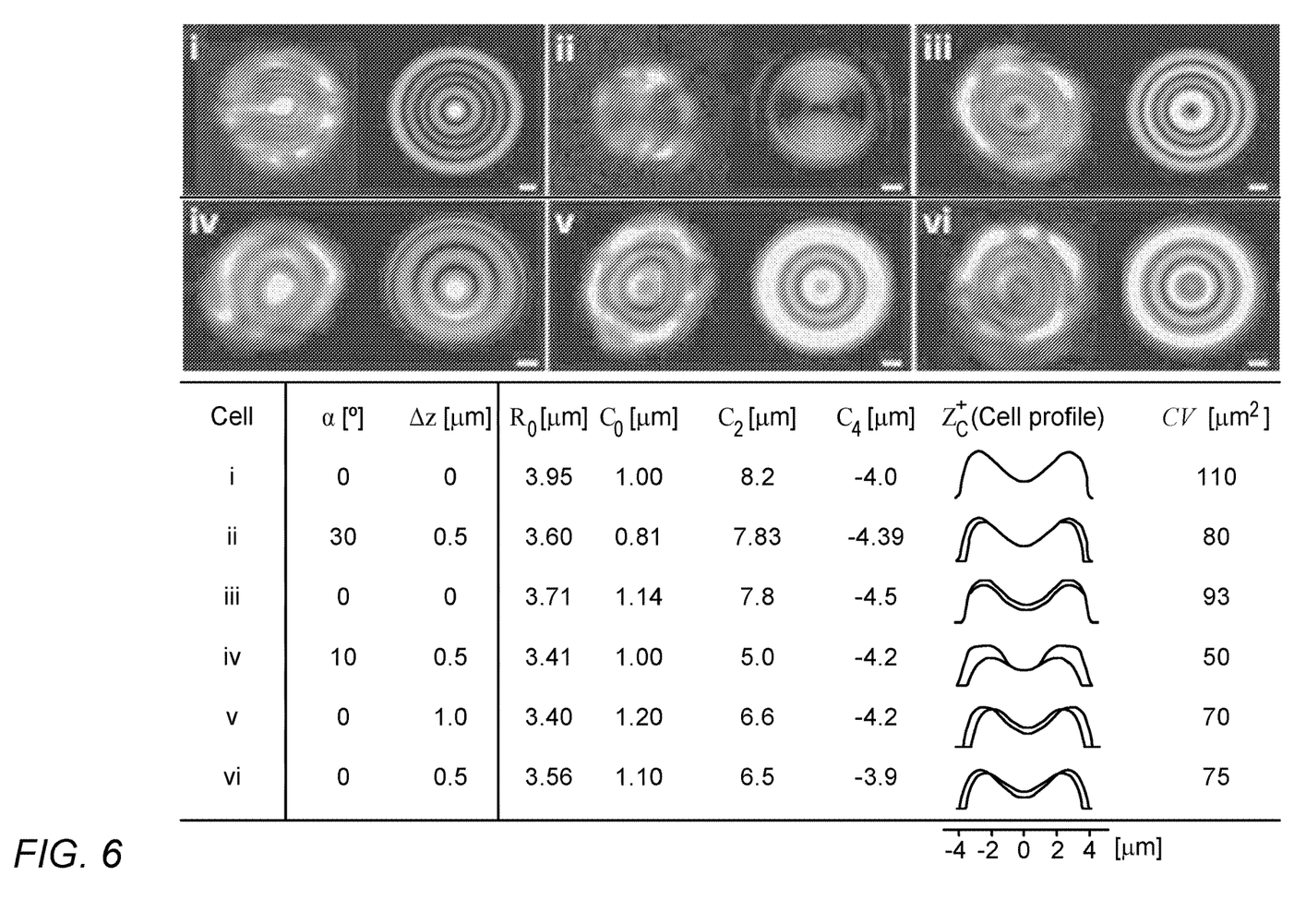
FIG. 6 shows a number of examples of actual cell images from the SEFC system, together with the corresponding simulated confocal images calculated to match them, and in addition, a table of the fit parameters used to simulate the SEFC image patterns for these cells, and the cell profile function.

Reference is now made to FIG. 6, in which the left hand position of the top panels, (i) to (vi), show examples of actual images of six cells from the SEFC system. The right hand position of each panel show the corresponding simulated confocal images that are calculated to be closest to each SEFC image. The scale bars shown in the micrograph images denote 1 μm, showing the high resolution achievable in the system. In the table in the bottom part of FIG. 6, there is shown the fit parameters used to simulate the actual SEFC patterns for these cells, and the cell profile function $Z_c^+$, shown by the solid curve profile. The profile of a typical average cell derived in the Evans and Fung reference is plotted by dashed curves for reference, and is sen to be close to the simulated profile $Z_c^+$. Assuming rotational symmetry, the corpuscular volume (CV) of each cell is estimated by calculating the volume between the cell's top and bottom interfaces using the integral:

$$CV = 2\pi \int_0^{R_0} 2Z_c^+(r)rdr \qquad (8)$$

Prior experimentation shows that while most of the imaged cells (typically 70%) show good agreement with the above described simulation model, and with shapes derived using Eq. (3), some of the images exhibit patterns inconsistent with the expected cell morphology. Comparison of transmission-mode wide field images with their co-registered confocal images of the cells reveal that such divergent patterns may occur whenever additional nearby cells are present within the optical path used for the SEFC imaging. While some of the distorted cell images could be attributed to abnormal cell morphologies due to sample mishandling, most of the observed irregular patterns are generally caused by wavefront distortions induced by neighboring RBCs. This is a further reason that a highly diluted sample of the blood is used for the confocal imaging methods, thereby reducing unwanted image artefacts.

Figure 7:
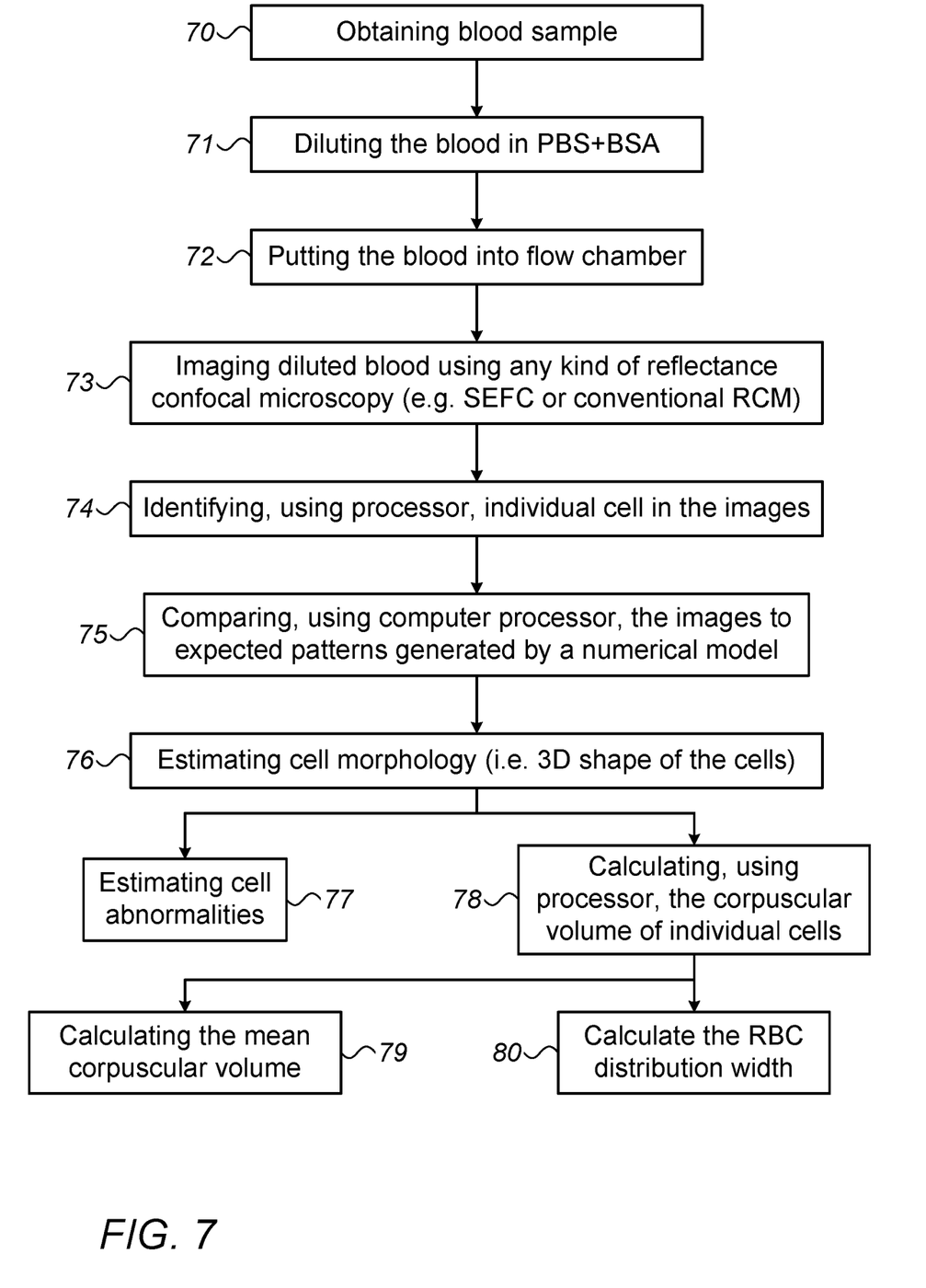
FIG. 7 illustrates a flow chart of one exemplary process for performing the analysis method using the system of the present disclosure.

Reference is now made to FIG. 7, which illustrates a flow chart of one exemplary process for performing the entire analysis method using the system of the present disclosure, starting with the collection of the blood sample. In step 70, the blood sample is drawn, and in step 71, the sample is diluted, typically in phosphate buffered serum containing 2% fetal bovine serum. In step 72, the diluted blood is flowed through the flow chamber, and in step 73, is imaged using any type of reflectance confocal imaging. In step 74, the system processor then identifies individual cells in the confocal images of the streaming blood solution, and may generate a data file reflecting the individual interference fringe pattern of each blood cell identified. In step 75, the interference fringe pattern of an individual blood cell is compared with expected patterns generated by a numerical model of the interaction of the illumination beam with a virtual cell having predefined dimensions and orientation. This comparison can be performed either with a bank of predetermined interference patterns, or by generating the comparison interference patterns using a routine running within the system, and iteratively tuning the physical parameters of the blood cell in an attempt to converge on a good match with the actually imaged interference pattern. The output of the processor, as shown in step 76, is the estimated three dimensional morphology of the viewed cell being analyzed. This information can be used for estimating cell abnormalities, such as abnormal sizes or abnormal shapes, as shown in step 77. Alternatively, and this is applicable for the majority of the cells viewed, this information can be used to determining the corpuscular volume of individual cells, as in step 78, from which the MCV can be calculated in step 79 or the distribution width of the RBCs can be determined as in step 80. The final output steps shown in steps 79 and 80 understood to be typical output information, and the processor can be programmed to determine any other readily accessible morphological or quantitative information regarding the analysis of the blood cells.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A method for determining details of the morphology of blood cells, the method comprising:
   obtaining at least one confocal image showing at least a portion of a blood cell from a sample of said blood cells located in the focal region of an illuminating beam of a reflectance confocal microscopy system;
   identifying in said at least one confocal image, an imaged optical interference pattern;
   comparing said imaged optical interference pattern with simulated optical interference patterns calculated from the interaction of an illuminating optical beam with three dimensional models of blood cells, each three dimensional model having its own known morphology; and
   based on said comparison, determining details of the morphology of said imaged blood cell.

2. A method according to claim 1, wherein said simulated optical interference patterns are calculated either by using the Fresnel approximation to express said interaction of an illuminating optical beam with features of said three dimensional models of blood cells, or are calculated based on said interaction of an illuminating optical beam with at least the surfaces of said cells facing and remote from said impinging illuminating optical beam.

3. A method according to claim 1, wherein: said simulated optical interference patterns are calculated also taking into account the orientation of said cells, and their position relative to the focal point of the confocally focused beam.

4. A method according to claim 1 wherein said sample of said blood cells is diluted in order to reduce any of imaging artefacts and the interaction of imaged cells with other cells.

5. A method according to claim 1 wherein said sample of said blood cells is flowed past said focal region of said illuminating beam in a flow chamber, or is a static sample set in a gel matrix.

6. A method according to claim 1 wherein said step of comparing is performed by storing a plurality of said simulated optical interference patterns with their associated morphologic details in a data bank, and determining which of said simulated optical interference patterns has parameters which match those of said imaged optical interference pattern to within a predetermined threshold.

7. A method according to claim 6, wherein said step of comparing comprises the determining of which of said simulated optical interference patterns has parameters having the closest fit to those of said imaged optical interference pattern.

8. A method according to claim 6, wherein said optical interference pattern comprises various ring shapes, and said parameters include at least one of the number of rings, the spacing between the various rings, and the optical intensity of the different rings.

9. A method according to claim 1, wherein said step of comparing comprises:
generating a limited number of said simulated optical interference patterns; comparing which of said limited number of simulated optical interference patterns is closest to said imaged optical interference pattern; and
iteratively adjusting physical parameters of said three dimensional model of the blood cell having a simulated optical interference patterns closest to said imaged optical interference pattern, in order to improve the match of said closest simulated optical interference pattern to said imaged optical interference pattern.

10. A method according to claim 1, wherein said step of comparing comprises:
(a) creating a three dimensional model of a blood cell which is estimated to have a simulated optical interference pattern comparable to said imaged optical interference pattern;
(b) adjusting at least one feature of said three dimensional model of a blood cell, and deriving a new simulated optical interference pattern by calculating the interaction of said illuminating optical beam with said adjusted three dimensional model of said blood cell;
(c) determining whether said new simulated optical interference pattern is a closer match to said imaged optical interference pattern; and
(d) repeating said adjusting step (b) and said determining step (c) until said match between said new simulated optical interference pattern and said imaged optical interference pattern falls within a predetermined level.

11. A method according to claim 1, wherein said three dimensional model of a blood cell is obtained by generating a mathematical analytic function which describes the morphology of said blood cell in three dimensions.

12. A method according to claim 11, wherein said morphology comprises at least the structure and symmetry of said blood cell.

13. A method according to claim 11, wherein said mathematical analytic function is a polynomial designation of the morphology of said blood cell.

14. A method according to claim 1, further comprising comparing said details of the morphology of said imaged blood cell to the morphology of a normal or an abnormal cell.

15. A method according to claim 1, further comprising calculating the corpuscular volume of said imaged blood cell.

16. A method according to claim 1 wherein said reflectance confocal microscopy system is spectrally encoded.

17. A system for analyzing blood cells in a blood sample, comprising:
a reflectance confocal microscopy system generating confocal interference images of a sample of blood cells disposed in the focal region of said microscope objective lens;
a signal processor module adapted to receive from said reflectance confocal microscope system at least one of said confocal interference images showing at least a portion of a blood cell;
a data bank comprising a plurality of simulated optical interference patterns calculated from the interaction of an illuminating optical beam with three dimensional models of blood cells, each three dimensional model having its own known morphology, and
an output unit configured to provide details of the blood analysis of said sample; wherein said signal processor module is adapted:
to identify in said image, an imaged optical interference pattern;
to compare said imaged optical interference pattern with simulated optical interference patterns stored in said data bank; and
based on said comparison, to determine details of the morphology of said confocally reflected imaged blood cell.

18. A system according to claim 17, wherein said details of the blood analysis of said sample comprise the fractional composition of said blood sample derived from the numbers of cells having specific morphologies.

19. A system according to claim 17, wherein said reflectance confocal microscopy system is spectrally encoded.

20. A system according to claim 17, wherein said system either comprises a blood flow chamber, and said system is adapted to flow said sample of blood cells past said focal region of said illuminating beam in said flow chamber, or said system is adapted to use a static sample of said blood cells set in a gel matrix.

21. A system according to claim 17, wherein said simulated optical interference patterns are calculated either by using the Fresnel approximation to express said interaction of an illuminating optical beam with features of said three dimensional models of blood cells, or are calculated based on said interaction of an illuminating optical beam with at least the surfaces of said cells facing and remote from said impinging illuminating optical beam.

\* \* \* \* \*